United States Patent
Muramatsu et al.

(10) Patent No.: US 8,263,283 B2
(45) Date of Patent: Sep. 11, 2012

(54) FUEL CELL SYSTEM AND CONTROL METHOD THEREOF

(75) Inventors: Yasuyuki Muramatsu, Shizuoka (JP); Masatsugu Oishi, Aichi (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 873 days.

(21) Appl. No.: 11/574,457

(22) PCT Filed: Aug. 29, 2005

(86) PCT No.: PCT/JP2005/015655
§ 371 (c)(1),
(2), (4) Date: May 11, 2009

(87) PCT Pub. No.: WO2006/025321
PCT Pub. Date: Mar. 9, 2006

(65) Prior Publication Data
US 2009/0214903 A1      Aug. 27, 2009

(30) Foreign Application Priority Data
Aug. 31, 2004   (JP) .................................. 2004-251385

(51) Int. Cl.
*H01M 8/04*   (2006.01)
(52) U.S. Cl. ......... 429/443; 429/442; 429/447; 429/448
(58) Field of Classification Search .................. 429/443, 429/442, 447, 448
See application file for complete search history.

(56) References Cited

U.S. PATENT DOCUMENTS

| | | | |
|---|---|---|---|
| 6,682,839 B2 * | 1/2004 | Wilkinson et al. ............ | 429/410 |
| 6,821,658 B2 | 11/2004 | Acker et al. | |
| 6,964,820 B2 | 11/2005 | Shimonosono et al. | |
| 2002/0006534 A1 * | 1/2002 | Wilkinson et al. .............. | 429/13 |
| 2002/0187374 A1 | 12/2002 | Yamauchi et al. | |
| 2003/0003336 A1 | 1/2003 | Colbow et al. | |
| 2003/0129462 A1 | 7/2003 | Yang et al. | |
| 2003/0148149 A1 | 8/2003 | Xie et al. | |
| 2004/0183501 A1 | 9/2004 | Ozeki | |

(Continued)

FOREIGN PATENT DOCUMENTS

JP            51-59353 A         5/1976
(Continued)

OTHER PUBLICATIONS

Official communication issued in the counterpart European Application No. 05775106.7, mailed on Oct. 24, 2007.

(Continued)

*Primary Examiner* — Patrick Ryan
*Assistant Examiner* — Julian Anthony
(74) *Attorney, Agent, or Firm* — Keating & Bennett, LLP (57) ABSTRACT

A fuel cell system includes a fuel cell which has an anode. A fuel supplying device circulates a supply of aqueous methanol solution to the anode in the fuel cell. The fuel supplying device includes an aqueous solution tank for storing the aqueous methanol solution. By moving aqueous methanol solution from the aqueous solution tank to a water tank, the amount of aqueous methanol solution which is in circulation at the time of start-up is made smaller than the amount for normal operation. The fuel cell system and a control method therefore are capable of shortening a time that is necessary for heating aqueous fuel solution to be supplied to the fuel cell to a predetermined temperature without reducing fuel utilization efficiency.

12 Claims, 9 Drawing Sheets

U.S. PATENT DOCUMENTS

| | | |
|---|---|---|
| 2006/0141307 A1 | 6/2006 | Ryoichi et al. |
| 2009/0110981 A1* | 4/2009 | Saito et al. ..................... 429/22 |

FOREIGN PATENT DOCUMENTS

| | | |
|---|---|---|
| JP | 58-023167 A | 2/1983 |
| JP | 58-165274 A | 9/1983 |
| JP | 61-045569 A | 3/1986 |
| JP | 62-128459 A | 6/1987 |
| JP | 63-168971 A | 7/1988 |
| JP | 2002-246052 A | 8/2002 |
| JP | 2002-362470 A | 12/2002 |
| JP | 2002-373684 A | 12/2002 |
| JP | 2003-282106 A | 10/2003 |
| JP | 3460703 B2 | 10/2003 |
| JP | 2004-055474 A | 2/2004 |
| JP | 2004-152741 A | 5/2004 |
| JP | 2004-530259 A | 9/2004 |
| WO | 01/52339 A1 | 7/2001 |
| WO | 2004/027913 A1 | 4/2004 |

OTHER PUBLICATIONS

Official Communication for PCT Application No. PCT/JP2005/015655 mailed on Dec. 6, 2005.

Official communication issued in the corresponding International Application No. PCT/JP2005/015655, mailed on Mar. 8, 2007.

Official communication issued in counterpart European Application No. 05 775 106.7, mailed on Jul. 29, 2008.

* cited by examiner

| Fuel Cell Temperature (°C) | Aqueous Solution Target Amount (L) |
|---|---|
| -20 — 20 | 1 |
| 20 — 30 | 1.1 |
| 30 — 40 | 1.2 |
| 40 — 50 | 1.4 |
| 50 — 55 | 1.6 |
| 55 — 60 | 2.0 |
| 60 — 62 | 2.5 |
| 62 — 65 | 3 |

| Amount of Charge in Secondary Battery (%) | Aqueous Solution Target Amount (L) |
|---|---|
| 0 — 20 | 1 |
| 20 — 30 | 1.2 |
| 30 — 40 | 1.4 |
| 40 — 50 | 1.5 |
| 50 — 60 | 1.8 |
| 60 — 70 | 2.2 |
| 70 — 80 | 2.7 |
| 80 — 100 | 3 |

(b)

FUEL CELL SYSTEM AND CONTROL METHOD THEREOF

BACKGROUND OF THE INVENTION

1. Field of the Invention

The present invention relates to fuel cell systems and methods for controlling the same. More specifically, the present invention relates to a fuel cell system which circulates a supply of aqueous fuel solution to an anode of a fuel cell, and a method of controlling the fuel cell system.

2. Description of the Related Art

Recently, there has been a desire in the field of direct methanol fuel cell systems that the time from start-up to full power generation should be shortened. As one solution, it has been disclosed to shorten a temperature rise time in which the aqueous methanol solution supplied to the fuel cell reaches a predetermined temperature.

For example, JP A 2004-55474 (Patent Document 1) discloses a technique in which a temperature raising device is provided between a fuel storing portion and a cell stack, and a portion of the aqueous methanol solution in the fuel storing portion is supplied to the temperature raising device at the time of start-up, thereby increasing the temperature of the aqueous methanol solution. The temperature raising device includes a platinum catalyst, and generates heat through a chemical reaction process involving oxidization when the aqueous methanol solution is brought into contact with the platinum catalyst and air.

The technique disclosed in Patent Document 1 enables a quick temperature rise of the aqueous methanol solution which is to be supplied to the fuel cell. However, a portion of the aqueous methanol solution is oxidized, which reduces the utilization efficiency of the methanol.

SUMMARY OF THE INVENTION

In order to overcome the problems described above, preferred embodiments of the present invention provide a fuel cell system and a control method of the fuel cell system capable of shortening the temperature rise time in which the aqueous fuel solution which is to be supplied to the fuel cell reaches a predetermined temperature without decreasing fuel utilization efficiency.

According to a preferred embodiment of the present invention, a fuel cell system includes a fuel cell having an anode, a fuel supplying device which circulates a supply of aqueous fuel solution to the anode of the fuel cell, and an aqueous solution amount adjusting device for setting an amount of the aqueous fuel solution in the fuel supplying device for start-up to an amount smaller than that used for a normal operation.

According to another preferred embodiment of the present invention, a method of controlling a fuel cell system, which includes a fuel cell having an anode and a fuel supplying device for circulating a supply of aqueous fuel solution to the anode of the fuel cell, includes a step of setting an amount of the aqueous fuel solution in the fuel supplying device for start-up to an amount smaller than that used for a normal operation.

According to various preferred embodiments of the present invention, the amount of the aqueous fuel solution in the fuel supplying device when the fuel cell system is started is smaller than the amount for normal operation. In other words, the amount of the aqueous fuel solution in circulation during the start-up operation of the fuel cell system is smaller than the amount during the normal operation. This decreases the thermal capacity of the aqueous fuel solution supplied to the fuel cell making it possible to shorten the temperature rise time for the aqueous fuel solution to reach a predetermined temperature, and to increase the amount of generated power closer to a maximum capacity in a short time after the start-up. Further, since heating is not provided by oxidization of the aqueous fuel solution, fuel utilization efficiency does not decrease.

Preferably, the fuel supplying device includes an aqueous solution tank for storing the aqueous fuel solution, and the aqueous solution amount adjusting device adjusts an amount of the aqueous fuel solution in the aqueous solution tank. In this case, the adjustment of the amount of the aqueous fuel solution is only necessary with respect to the amount of aqueous fuel solution in the aqueous solution tank. Therefore, the adjustment to the amount of aqueous fuel solution in the fuel supplying device becomes easier.

Preferably, the fuel cell system further includes a tank separate from the aqueous solution tank for storing the aqueous fuel solution, and the aqueous solution amount adjusting device is capable of moving the aqueous fuel solution from the aqueous solution tank to the separate tank. In this case, the amount of the aqueous fuel solution in the fuel supplying device can be adjusted easily by only moving the aqueous fuel solution from the aqueous solution tank to the separate tank.

Preferably, the fuel cell system further includes a water tank for storing liquid discharged from the fuel cell, and the aqueous solution amount adjusting device is capable of moving the aqueous fuel solution from the fuel supplying device to the water tank. In this case, an extra amount of the aqueous fuel solution in the fuel supplying device may simply be moved to the water tank, so there is no need to provide other separate tanks.

Preferably, the fuel cell system further includes a relief tank for receiving the aqueous fuel solution from the fuel supplying device, and the aqueous solution amount adjusting device is capable of moving the aqueous fuel solution from the fuel supplying device to the relief tank. In this case, an extra amount of the aqueous fuel solution in the fuel supplying device is moved to the relief tank, so there is no need for modifying existing fuel cell systems which might affect other components which define the existing fuel cell system.

Preferably, the fuel cell system further includes a temperature detecting device for detecting a temperature of the fuel cell, and the aqueous solution amount adjusting device adjusts the amount of the aqueous fuel solution in the fuel supplying device based on the temperature of the fuel cell detected by the temperature detecting device. In this case, it becomes possible to increase the temperature of the aqueous fuel solution quickly while maintaining the temperature stability of the fuel cell. In addition, there is no need for excessively decreasing the amount of the aqueous fuel solution, and if a pump is used to control the amount of the liquid, drive time of the pump can be optimized and power consumption can be decreased.

Preferably, the fuel cell system further includes a secondary battery electrically connected with the fuel cell and a charge detection device for detecting an amount of the charge in the secondary battery. The aqueous solution amount adjusting device adjusts the amount of the aqueous fuel solution in the fuel supplying device in accordance with the amount of the charge detected by the charge detecting device. By adjusting the initial amount of the aqueous fuel solution in the fuel supplying device in this way, it becomes possible to heat the aqueous fuel solution to a predetermined power generation temperature before depleting the charge in the secondary battery.

Preferably, the aqueous solution amount adjusting device increases the amount of the aqueous fuel solution in the fuel supplying device to a predetermined amount for the normal operation after the start-up operation. In this case, the temperature increase is accelerated during the start-up operation due to the decreased amount of the aqueous fuel solution, whereas during the normal operation after the predetermined temperature has been attained, the amount of the aqueous fuel solution is increased to a predetermined amount which provides sufficient thermal capacity and stabilizes the system temperature, the concentration of the aqueous fuel solution, etc.

Preferably, the fuel cell system further includes a temperature detecting device for detecting a temperature of the fuel cell, and the aqueous solution amount adjusting device increases the amount of the aqueous fuel solution in the fuel supplying device in accordance with the temperature of the fuel cell detected by the temperature detecting device. In this case, the amount of the aqueous fuel solution in the fuel supplying device is increased gradually in accordance with the fuel cell temperature. Therefore, it becomes possible to bring the amount of the aqueous fuel solution back to a predetermined amount without sacrificing the temperature stability of the fuel cell.

Preferably, the fuel cell system further includes a temperature detecting device for detecting a temperature of the fuel cell, and the aqueous solution amount adjusting device increases the amount of the aqueous fuel solution in the fuel supplying device when the temperature of the fuel cell detected by the temperature detecting device has reached a predetermined temperature, such that the temperature of the fuel cell will stay at the predetermined temperature. In this case, the amount of the aqueous fuel solution in the fuel supplying device is increased so that the fuel cell temperature will be kept at a predetermined temperature. Therefore, it is possible to bring the amount of the aqueous fuel solution back to a predetermined amount without sacrificing the temperature stability of the fuel cell.

Preferably, the fuel cell system further includes a temperature detecting device for detecting a temperature of the fuel cell, and the aqueous solution amount adjusting device increases the amount of the aqueous fuel solution in the fuel supplying device to the predetermined amount when the temperature of the fuel cell detected by the temperature detecting device has reached a predetermined temperature. By directly increasing the amount of the aqueous fuel solution in the fuel supplying device to a predetermined amount specified for the normal operation when the fuel cell temperature has reached a predetermined temperature as described above, it becomes possible to shift to the normal operation quickly.

Fuel cell systems for transportation equipment are usually smaller than those for stationary use and, thus, the capacity of the secondary battery, for example, is limited. Thus, the system must be able to increase the temperature of the aqueous fuel solution quickly at the time of start-up in order to shift to normal operation in a short time. For these reasons, the preferred embodiments of the present invention are suitable for use in transportation equipment.

According to the preferred embodiments of the present invention, the expression of circulating a supply of the aqueous fuel solution to the anode in the fuel cell means that the aqueous fuel solution is supplied to the anode in the fuel cell together with the aqueous fuel solution which was discharged from the anode in the fuel cell.

Also, the term "start-up" of the fuel cell system means a period of time which begins when the fuel cell system's main switch is turned ON, and continues until a time when the system starts its normal operation. The term "normal operation" of the fuel cell system means a state of consistent power generation, e.g., a state of operation where the temperature difference between a fuel cell temperature and a fuel cell target temperature which is set by a normal amount of aqueous solution is within, for example, 10° C.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 5($a$) shows table data indicating a relationship between fuel cell temperatures and target amounts of aqueous solution; FIG. 5($b$) is a graph thereof.

FIG. 9($a$) shows table data indicating a relationship between the charge in a secondary battery and target amounts of aqueous solution; FIG. 9($b$) is a graph thereof.

DETAILED DESCRIPTION OF THE PREFERRED EMBODIMENTS

Hereinafter, preferred embodiments of the present invention will be described with reference to the drawings.

Figure 1:
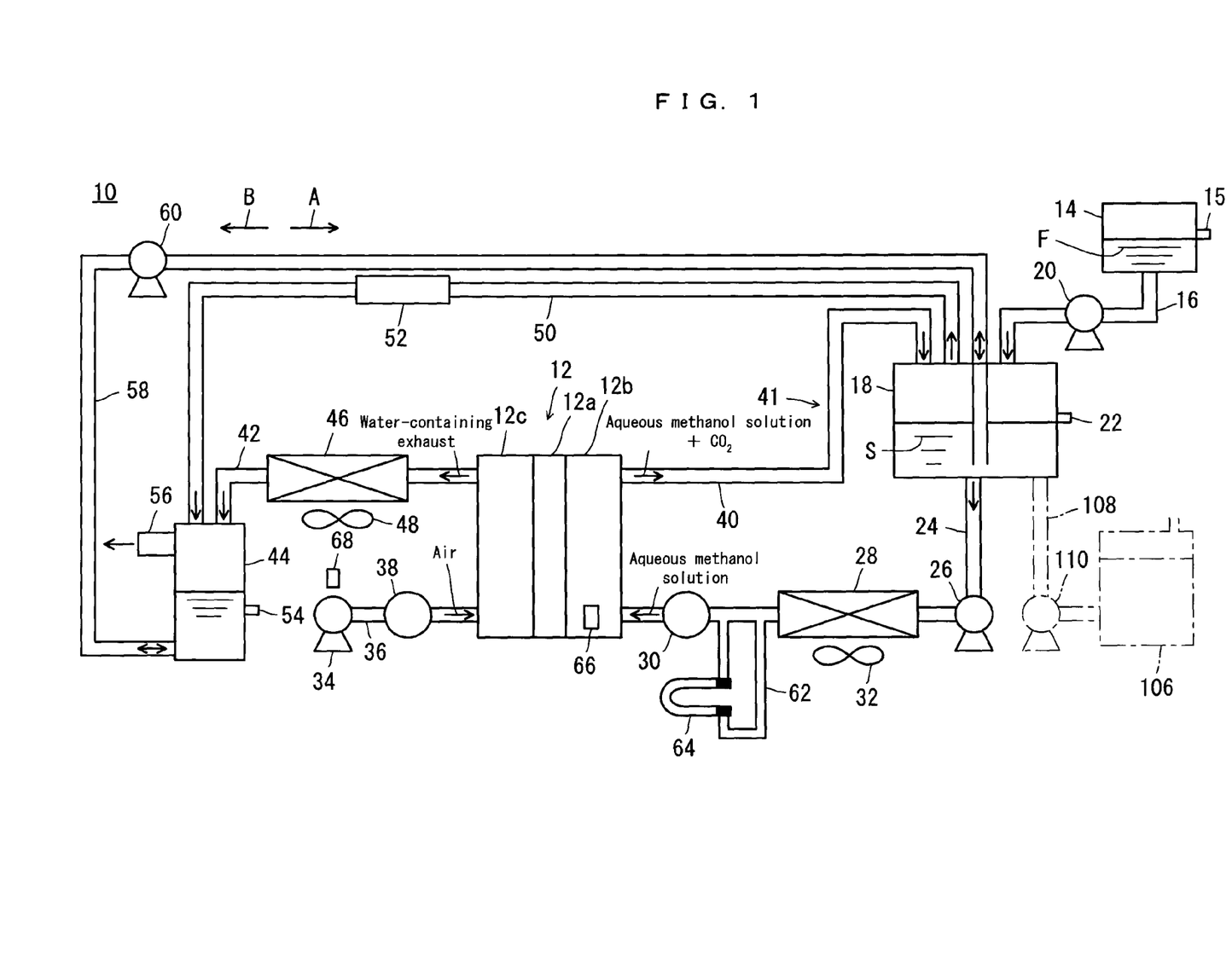
FIG. 1 is a schematic diagram showing a primary portion of a fuel cell system according to a preferred embodiment of the present invention.
Figure 2:
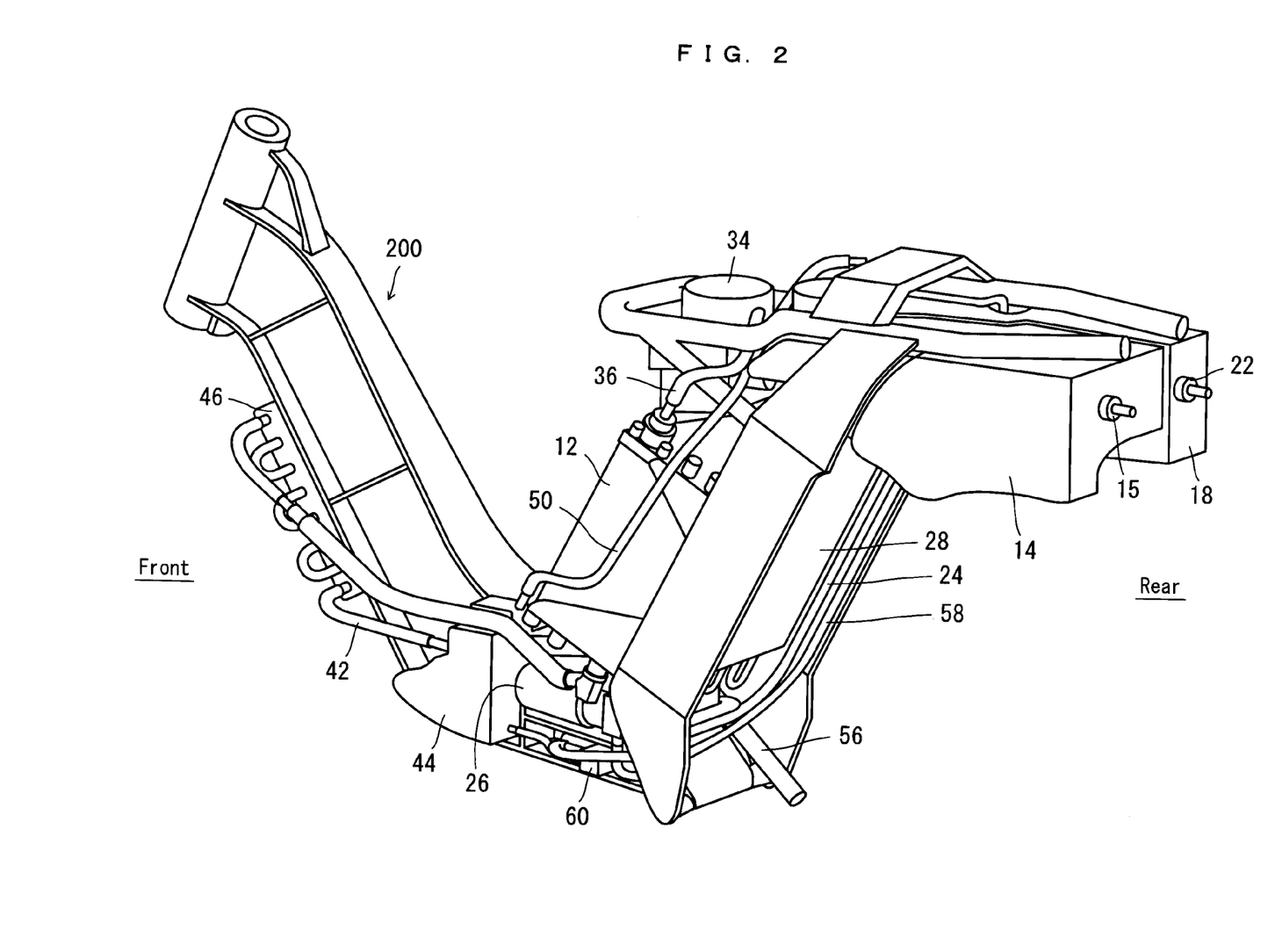
FIG. 2 is a perspective view showing the fuel cell system mounted on a frame of a motorbike.
Figure 3:
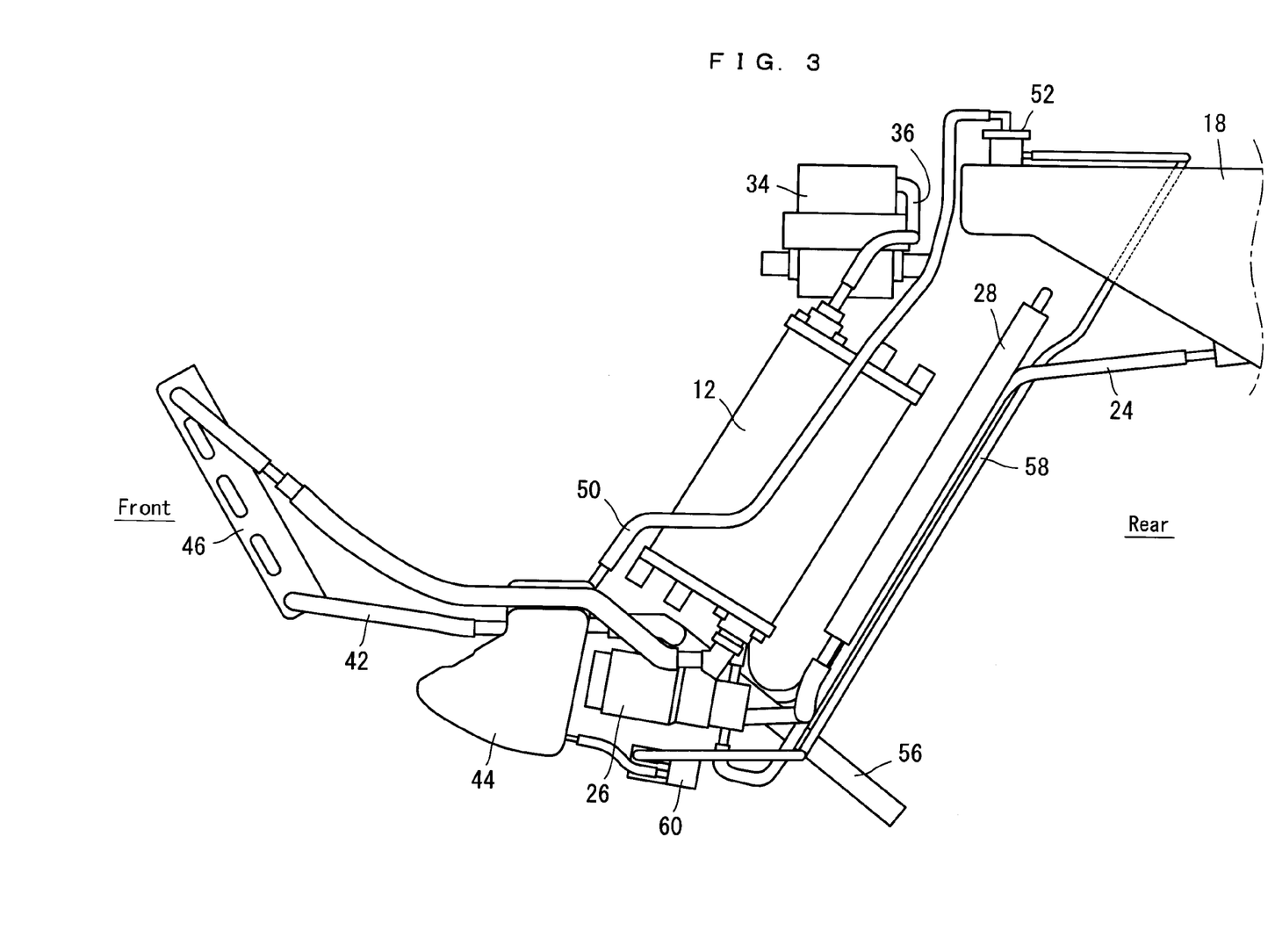
FIG. 3 is a schematic view showing a primary portion of the fuel cell system.

As shown in FIG. 1 through FIG. 4, a fuel cell system 10 according to a preferred embodiment of the present invention is a direct methanol fuel cell system. Direct methanol fuel cell systems do not require a reformer and so can be utilized suitably in equipment which requires portability, as well as in equipment in which size reduction is desirable. In the present description, the fuel cell system 10 is preferably used on a motorbike as an example of transportation equipment. Note, however, that the motorbike is represented only by a vehicle frame 200 as shown in FIG. 2. Note also that as in FIG. 2, the left side of the diagram represents the front of the vehicle while the right side represents the rear of the vehicle. Further, the fuel cell system 10 is disposed along the vehicle frame 200.

Referring mainly to FIG. 1, the fuel cell system 10 includes a fuel cell 12. The fuel cell 12 is configured as a fuel cell stack composed of a plurality of direct methanol fuel cells connected in series (in layers), each including an electrolyte 12$a$, an anode (fuel electrode) 12$b$, and a cathode (air electrode) 12$c$ which sandwich the electrolyte 12$a$ in between.

The fuel cell system 10 includes a fuel tank 14 which stores highly concentrated methanol fuel (an aqueous solution containing approximately 50 weight percent of methanol) F. The fuel tank 14 is connected, via a fuel supply pipe 16, with an aqueous solution tank 18 which stores aqueous methanol solution S which serves as an aqueous fuel solution. The fuel supply pipe 16 is provided with a fuel pump 20. The fuel pump 20 supplies the aqueous solution tank 18 with the methanol fuel F from the fuel tank 14.

The fuel tank 14 is provided with a level sensor 15 for detecting the level of methanol fuel F in the fuel tank 14. Similarly, the aqueous solution tank 18 is provided with a level sensor 22 for detecting the level of aqueous methanol solution S in the aqueous solution tank 18. The level sensors 15, 22 are each preferably a float-type sensor, for example. The level of fluid in the tank can be detected as a float (not illustrated) moves up and down in the tank following the level of the fluid. In other words, the amount of the fluid in the tank can be detected based on the position of the moving float. The same applies to a level sensor 54 to be described later.

The aqueous solution tank 18 is connected, via an aqueous solution pipe 24, with the anode 12b of the fuel cell 12. The aqueous solution pipe 24 is provided with an aqueous solution pump 26, a radiator 28 functioning as a heat exchanger, and an aqueous solution filter 30, in this order from the upstream side. A cooling fan 32 is provided near the radiator 28 in order to cool the radiator 28. The aqueous methanol solution S in the aqueous solution tank 18 is pumped by the aqueous solution pump 26 toward the anode 12b, cooled by the radiator 28 as necessary, and purified by the aqueous solution filter 30 before being supplied to the anode 12b.

On the other hand, the cathode 12c in the fuel cell 12 is connected with an air pump 34 via an air pipe 36. The air pipe 36 is provided with an air filter 38. Thus, air which contains oxygen is sent from the air pump 34, purified by the air filter 38, and then supplied to the cathode 12c.

The anode 12b and the aqueous solution tank 18 are connected with each other via a pipe 40, so unused aqueous methanol solution and carbon dioxide discharged from the anode 12b are supplied to the aqueous solution tank 18.

In the present preferred embodiment, a fuel supplying device 41 includes the aqueous solution tank 18, the aqueous solution pipe 24, the aqueous solution pump 26, the radiator 28, the aqueous solution filter 30, the cooling fan 32, and the pipe 40. The fuel supplying device 41 circulates a supply of the aqueous methanol solution S to the anode 12b in the fuel cell 12.

Further, the cathode 12c is connected with the water tank 44 via a pipe 42. The pipe 42 is provided with a radiator 46 which functions as a gas-liquid separator. A cooling fan 48 is disposed near the radiator 46 in order to cool the radiator 46. Exhaust containing water (water and water vapor) which is discharged from the cathode 12c is supplied to the water tank 44 via the pipe 42. The air pump 34 is driven to promote introduction of the exhaust into the water tank 44.

Further, the aqueous solution tank 18 and the water tank are connected with each other via a $CO_2$ vent pipe 50. The $CO_2$ vent pipe 50 is provided with a methanol trap 52 in order to separate the components of the aqueous methanol solution S. The carbon dioxide discharged from the aqueous solution tank 18 is thus supplied to the water tank 44.

The water tank 44 is provided with a level sensor 54 which detects the level of water in the water tank 44. The water tank is provided with an exhaust gas pipe 56. The exhaust gas pipe discharges carbon dioxide and the exhaust from the cathode 12c. The water tank 44 thus stores water which is produced by the electrochemical reaction and a small amount of methanol carried as a result of crossover in the form of liquid.

The water tank 44 is connected with the aqueous solution tank 18 via a water recycling pipe 58. The water recycling pipe is provided with a water pump 60. In the present preferred embodiment, the water pump 60 is capable of selectively pumping the aqueous solution and water in direction A or direction B. By switching the pumping direction of the water pump 60 depending on the situation of the aqueous solution tank 18, the aqueous solution from the water tank 44 is sent either to the aqueous solution tank 18 (direction indicated by arrow A) or vice versa (direction indicated by arrow B). In the present preferred embodiment, the water recycling pipe 58 has an end extending into the aqueous solution tank 18 so as to submerge the end into the aqueous solution. In other words, according to the fuel cell system 10, flow of the aqueous methanol solution S can be branched off from the circulation supply route for temporary storage of the aqueous methanol solution S in a separate storage space (tank), so it is easier to reduce the amount of aqueous solution S in circulation.

Further, in the aqueous solution pipe 24, a bypass pipe 62 is arranged between the radiator 28 and the aqueous solution filter 30.

Figure 4:
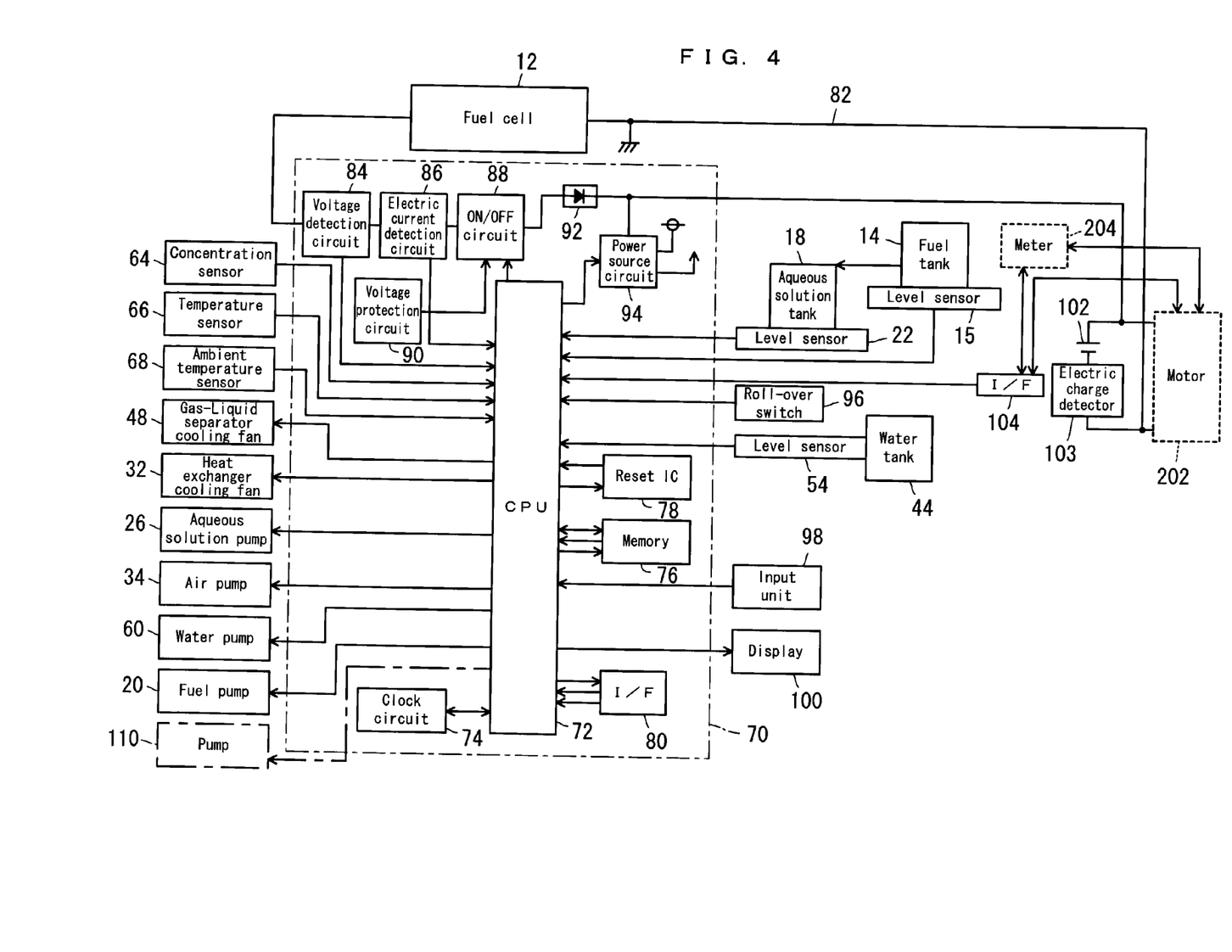
FIG. 4 is a block diagram showing an electric configuration of the fuel cell system.

Reference is now also made to FIG. 4. In the fuel cell system 10, the bypass pipe 62 is provided with a concentration sensor 64 which detects the concentration of aqueous methanol solution S. A temperature sensor 66 which detects the temperature of fuel cell 12 is attached to the fuel cell 12. An ambient temperature sensor 68 which detects the ambient temperature is provided near the air pump 34. In the present preferred embodiment, the temperature of the fuel cell 12 detected by the temperature sensor 66 is regarded as the temperature of aqueous methanol solution S in circulation. Alternatively, the temperature of the cell stack 12 itself may be detected as the temperature of the fuel cell 12, and still another alternative is to detect the temperature of the exhaust from the cathode 12c.

As shown in FIG. 4, the fuel cell system 10 includes a control circuit 70.

The control circuit 70 includes a CPU 72 serving as a control which performs necessary arithmetic operations and provides control over the operation of the fuel cell system 10; a clock circuit 74 which provides the CPU 72 with clock signals; a memory 76 which may include an EEPROM, for example, for storing programs and data for controlling the fuel cell system 10, calculation data, etc; a reset IC 78 which prevents the fuel cell system 10 from performing faulty operations; an interface circuit (not illustrated) for connection with external devices; a voltage detection circuit 84 for detecting the voltage in an electric circuit 82 which connects the fuel cell 12 with a motor 202 that drives the motorbike; an electric current detection circuit 86 for detecting the electric current flowing in the electric circuit 82; an ON/OFF circuit 88 which opens and closes the electric circuit 82; a voltage protection circuit 90 which prevents over voltage in the electric circuit 82; a diode 92 provided in the electric circuit 82; and a power source circuit 94 which supplies a predetermined voltage to the electric circuit 82.

In the control circuit 70 described above, the CPU 72 is supplied with detection signals from the concentration sensor 64, the temperature sensor 66, and the ambient temperature sensor 68, as well as detection signals from a roll-over switch 96 which detects whether or not the vehicle is rolled over, and signals from an input unit 98 for settings and data input. Further, the CPU 72 is supplied with detection signals from the level sensors 15, 22, and 54.

The CPU 72 provides control of such components as the fuel pump 20, the aqueous solution pump 26, the air pump 34, the heat exchanger cooling fan 32, the gas-liquid separator cooling fan 48, and the water pump 60. Also, the CPU 72 controls a display 100 which displays various kinds of information for the rider of the motorbike.

Further, the fuel cell 12 is connected with a secondary battery 102 and an electric charge detector 103 which detects the amount of charge (remaining power) in the secondary battery 102. The secondary battery 102 and the electric charge detector 103 which are connected with each other in series have a parallel connection with the motor 202. The secondary battery 102, which provides power to supplement the output from the fuel cell 12, is charged by the fuel cell 12 with electric energy, and gives electric energy to the motor 202 and the other components by discharging the stored electric energy.

The motor 202 is connected with a meter 204 for various measurements of the motor 202. Data and status information about the motor 202 measured by the meter 204 are supplied to the CPU 72 via an interface circuit 104.

Figure 5:
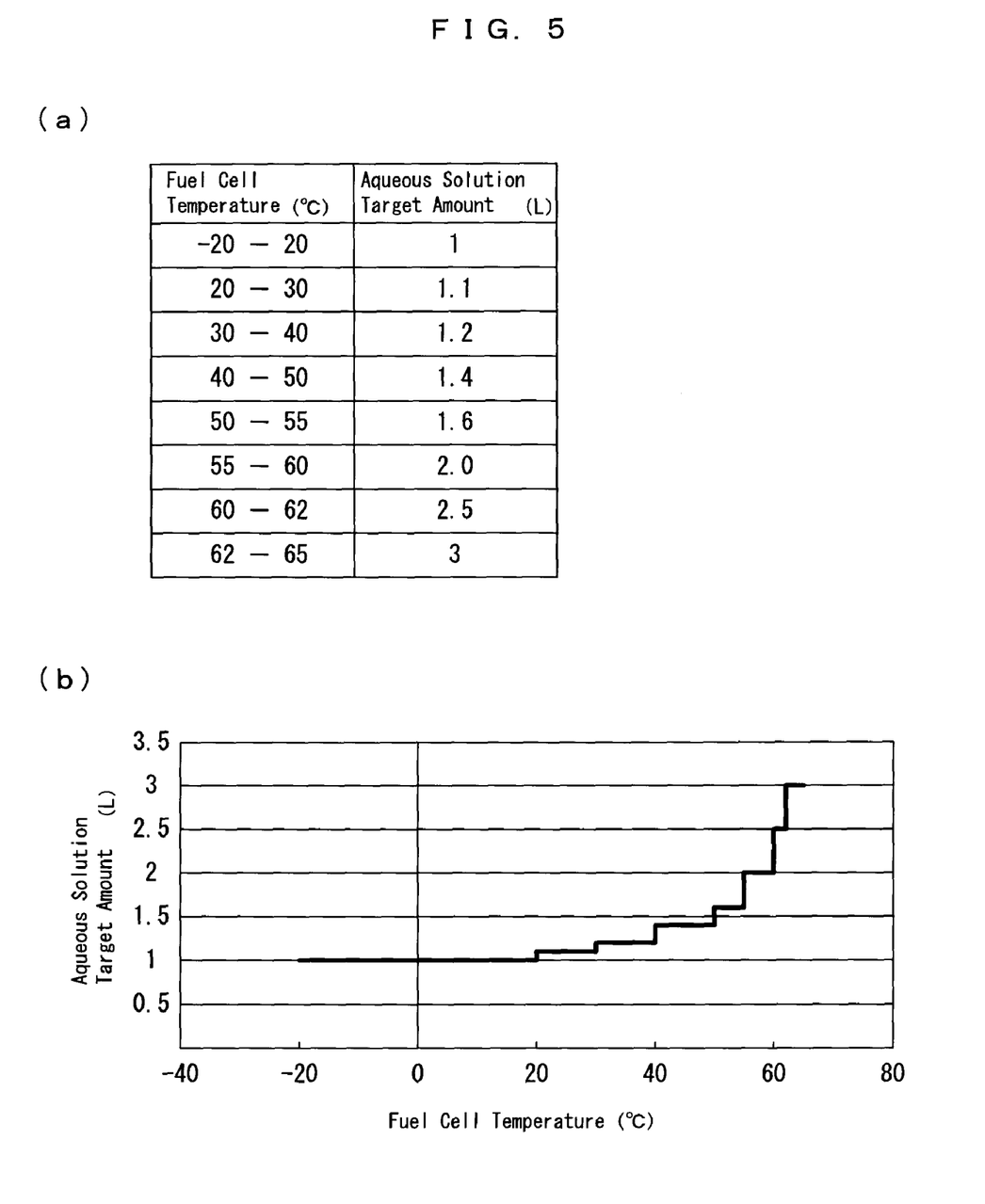
Figure 6:
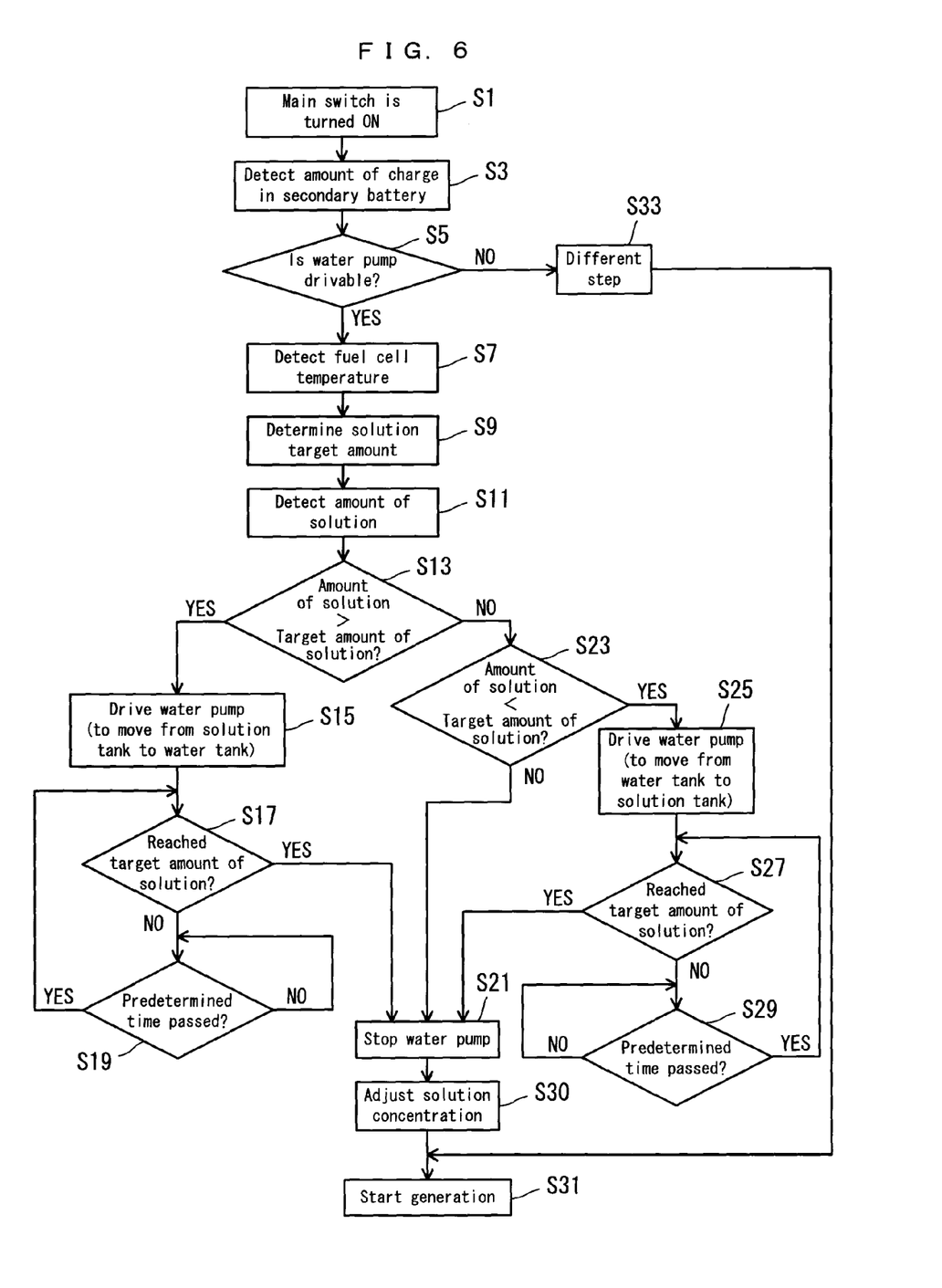
FIG. 6 is a flowchart showing an example of a main operation of the fuel cell system at start-up.
Figure 7:
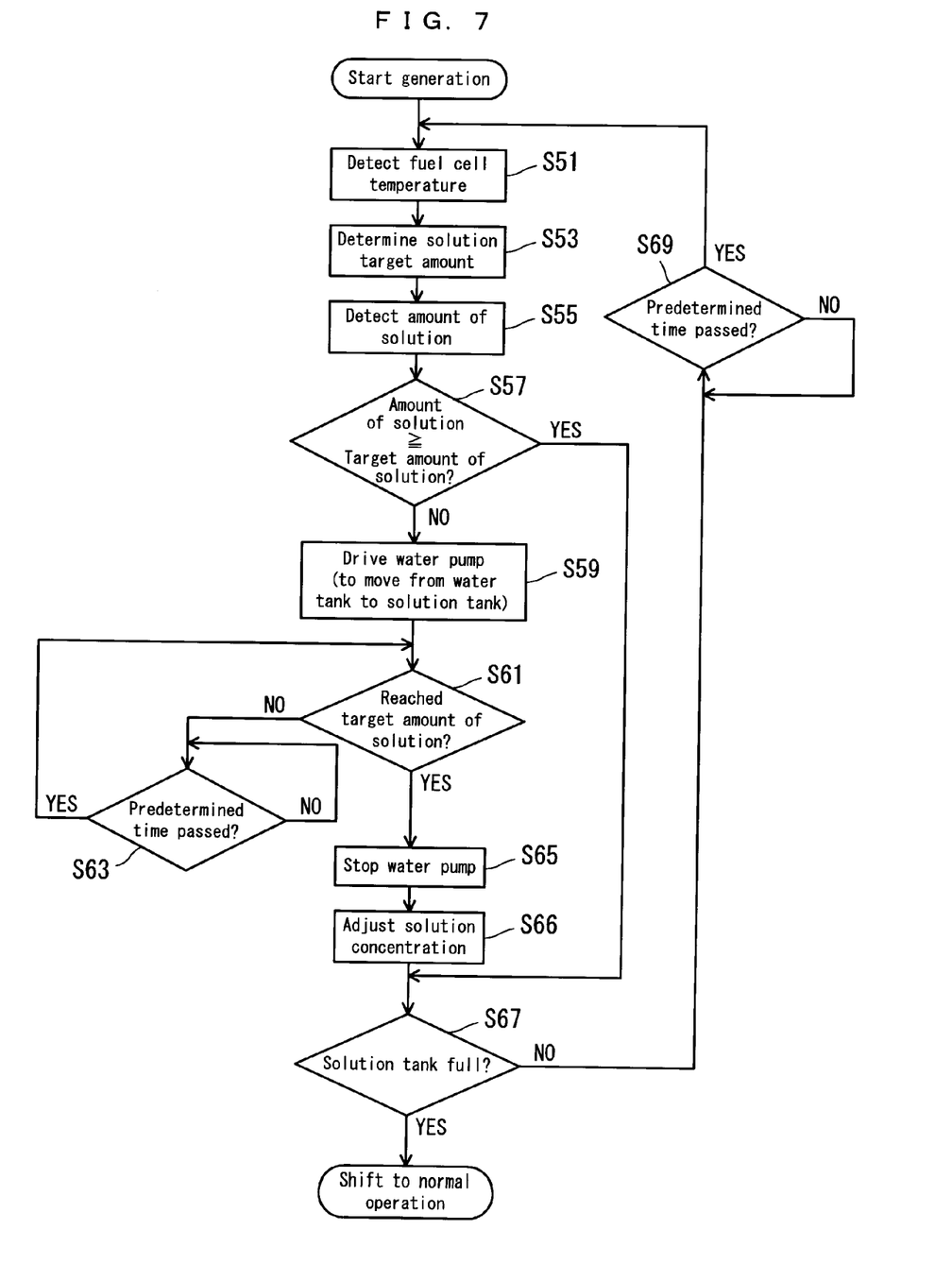
FIG. 7 is a flowchart showing an example of a main operation of the fuel cell system after starting power generation.
Figure 8:
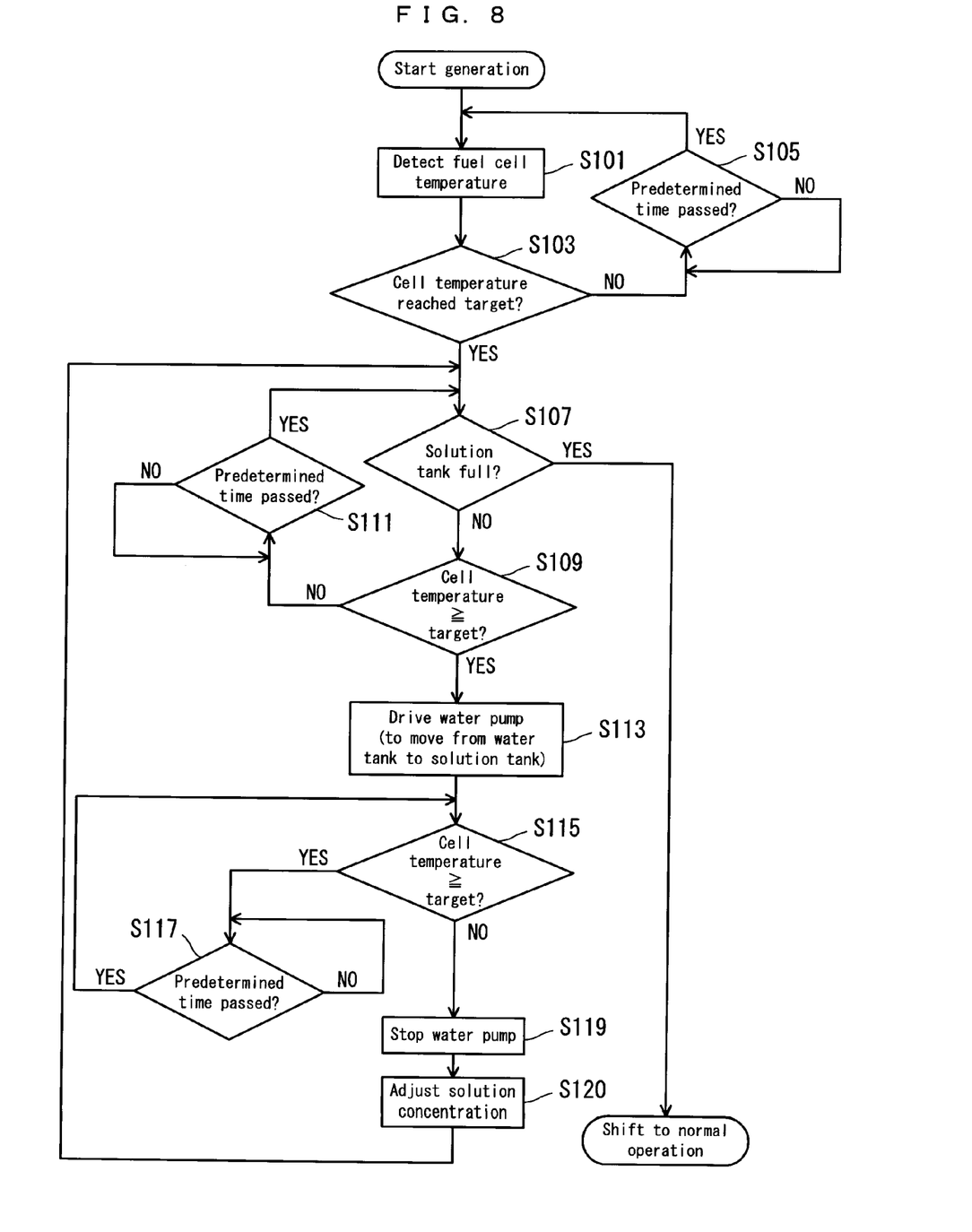
FIG. 8 is a flowchart showing another example of a main operation of the fuel cell system after starting power generation.

The memory 76 stores table data as shown in FIG. 5(a) which relates the temperature of the fuel cell 12 to a target amount of the aqueous solution, programs for executing operations as shown in FIG. 6 through FIG. 8, and other information. FIG. 5(b) is a graph which shows the relationship between the temperature of the fuel cell 12 and the target amount of the aqueous solution. The term target amount of aqueous solution is a target amount of aqueous methanol solution S to be stored in the aqueous solution tank 18.

As understood from FIGS. 5(a) and 5(b), the target amount of the aqueous solution is set higher as the fuel cell temperature becomes higher. When the temperature is high, and if the aqueous solution tank 18 is full, the amount of liquid which must be decreased (moved) from the aqueous solution tank 18 at the time of start-up is small, thereby reducing the amount of electricity necessary for moving the liquid to the separate tank. On the other hand, the target amount of the aqueous solution is smaller as the fuel cell temperature becomes lower. When the temperature is low, a large amount of the aqueous solution is moved to the other tank, thereby enabling an increase in the temperature rising speed at an early period of start-up.

It should be noted that in normal operation, a greater amount of aqueous methanol solution S in the aqueous solution tank 18 leads to a more stable temperature of the aqueous methanol solution S which is circulating in the fuel cell 12 and the fuel supplying device 41, and to a smaller fluctuation in the concentration of methanol in the aqueous solution. For this reason, a greater amount of aqueous methanol solution is generally more preferable in operating the fuel cell system 10.

In the present preferred embodiment, the aqueous solution amount adjusting device includes the water recycling pipe 58, the water pump 60, and the control circuit 70.

An operation of the fuel cell system 10 at a time of power generation will now be described.

When power generation is started, aqueous methanol solution S which is stored in the aqueous solution tank 18 and has a desired level of concentration is pumped by the aqueous solution pump 26 toward the fuel cell 12. The solution is cooled as necessary by the radiator 28, purified by the aqueous solution filter 30, and then supplied to the anode 12b. On the other hand, air which contains oxygen is pumped by the air pump 34 toward the fuel cell 12. The air is purified by the air filter 38 and then supplied to the cathode 12c.

On the anode 12b in the fuel cell 12, methanol and water in the aqueous methanol solution S react electrochemically with each other to produce carbon dioxide and hydrogen ions. The hydrogen ions move through the electrolyte 12a to the cathode 12c, where the hydrogen ions react electrochemically with oxygen in the air which is supplied to the cathode 12c, to produce water (water vapor) and electric energy.

Carbon dioxide which forms on the anode 12b in the fuel cell 12 flows through the pipe 40, the aqueous solution tank 18, and the $CO_2$ vent pipe 50 to the water tank 44, and is then discharged from the exhaust gas pipe 56.

On the other hand, most of the water vapor which forms on the cathode 12c in the fuel cell 12 is liquefied and discharged in the form of water, with saturated water vapor being discharged in the form of a gas. A portion of the water vapor which is discharged from the cathode 12c is cooled by the radiator 46 and liquefied by lowering the dew point. Liquefaction of the water vapor by the radiator 46 is performed by operation of the cooling fan 48. Water (water and water vapor) and unused air from the cathode 12c are supplied to the water tank 44 via the pipe 42. Also, water which has moved to the cathode 12c due to water crossover is discharged from the cathode 12c and supplied to the water tank 44. Further, water and carbon dioxide which forms at the cathode 12c due to methanol crossover are discharged from the cathode 12c and supplied to the water tank 44.

It should be noted that the term water crossover is a phenomenon in which a few mols of water moves to the cathode 12c accompanying the hydrogen ions which form at the anode 12b and are moving to the cathode 12c. The term methanol crossover is a phenomenon in which methanol moves to the cathode 12c accompanying the hydrogen ions which move to the cathode 12c. Methanol which has moved to the cathode 12c reacts with air supplied from the air pump 34, and is thereby decomposed into water and carbon dioxide.

Water (liquid) which was collected in the water tank 44 is recycled appropriately by the water pump 60, through the water recycling pipe 58 to the aqueous solution tank 18, where the water is used for the aqueous methanol solution S.

Next, description will be made of an example of a main operation of the fuel cell system 10 at the time of start-up.

Referring to FIG. 6, first, when an unillustrated main switch is turned ON, a "main switch ON" signal is inputted to the CPU 72 (Step S1), and the system waits for a rise of a power source voltage. When the power source voltage becomes stable, the electric charge detector 103 detects the amount of the charge (remaining power) in the secondary battery 102 (Step S3). Based on the detected amount of the charge in the secondary battery 102, the system checks if the water pump 60 is drivable or not (Step S5).

If the detected amount of charge in the secondary battery 102 is sufficient to supply power which is necessary for generating electricity (i.e., power for driving the system components), the system determines that it can drive the water pump 60. Then, the temperature sensor 66 detects the temperature of the fuel cell 12 (Step S7).

The system then makes reference to the table data shown in FIG. 5(a), to select/determine a target amount of the aqueous solution corresponding to the temperature detected in Step S7 (Step S9). Then, the level sensor 22 detects the current amount of aqueous methanol solution S in the aqueous solution tank 18 (Step S11). The system checks if the detected amount of the aqueous solution is greater than the target amount of the aqueous solution which was determined on the basis of the fuel cell temperature, i.e., the temperature of the aqueous fuel solution (Step S13). If the detected amount of the aqueous solution is greater than the target amount (Step S13: YES), the power in the secondary battery 102 is used to drive the water pump 60, whereby aqueous methanol solution S in the aqueous solution tank 18 is sent through the water recycling pipe 58 to the water tank 44 (in the direction B shown in FIG. 1) (Step S15). The system then checks if the amount of the aqueous solution in the aqueous solution tank 18 has reached the target amount of the aqueous solution (Step S17). If the amount of the aqueous solution in the aqueous solution tank 18 has not yet reached the target amount of the aqueous solution, pumping of the aqueous methanol solution S is continued until Step S19 determines that a predetermined amount of time has passed. After the lapse of the predetermined amount of time, Step S17 checks again if the target amount of the aqueous solution has been reached. The pumping of aqueous methanol solution S is continued until S17 determines that the amount of the aqueous solution in the aqueous solution tank 18 has reached the target amount of the aqueous solution. Once Step S17 determines "YES", the water pump 60 is stopped (Step S21).

On the other hand, if Step S13 determines that the amount of the aqueous solution in the aqueous solution tank 18 is not greater than the target amount of the aqueous solution, the system checks if the amount of aqueous solution is smaller than the target amount of the aqueous solution (Step S23). If the amount of aqueous solution is smaller than the target amount of aqueous solution, power in the secondary battery 102 is used to drive the water pump 60 to send water or aqueous solution in the water tank 44 to the aqueous solution tank 18 through the water recycling pipe 58 (in the direction A shown in FIG. 1) (Step S25). The amount of the aqueous solution in the aqueous solution tank 18 can be smaller than the target amount of the aqueous solution when, for example, a long time has passed since power generating operation was stopped and crossover has caused aqueous solution to leak out of the aqueous solution tank 18.

Then, the system checks if the above described adjustment of the amount of the aqueous solution has brought the amount of the aqueous solution in the aqueous solution tank 18 to the target amount of the aqueous solution (Step S27). If the amount of aqueous solution in the aqueous solution tank 18 has not yet reached the target amount of the aqueous solution, pumping of water or the aqueous solution is continued until Step S29 determines a predetermined amount of time has passed. After the lapse of the predetermined amount of time, Step S27 checks again if the amount has reached the target amount of the aqueous solution. The above described pumping is continued until Step S27 determines that the amount of the aqueous solution in the aqueous solution tank 18 has reached the target amount of the aqueous solution. Once Step S27 determines "YES", the water pump 60 is stopped (Step S21).

With the above, if Step S23 determines "NO", i.e., if the amount of the aqueous solution in the aqueous solution tank 18 is equal to the target amount of the aqueous solution, the system proceeds directly to Step S21.

After Step S21, adjustment is made so that the aqueous solution in the aqueous solution tank 18 has a desired concentration (Step S30). During this step, the concentration of aqueous solution is detected by, for example, a concentration sensor (not illustrated) provided in the aqueous solution tank 18. If the concentration of the aqueous solution is lower than the desired value, methanol fuel is added from the fuel tank 14 whereas water or aqueous solution is added from the water tank 44 if the concentration is higher than the desired value.

Thereafter, system components such as the fuel pump 20, the aqueous solution pump 26, the air pump 34, the heat exchanger cooling fan 32, the gas-liquid separator cooling fan 48 and the water pump 60 are driven to generate power from the fuel cell 12 (Step S31).

It should be noted that if the amount of the charge in the secondary battery 102 is too small to cover the amount of power necessary for generating electricity (i.e., for driving the system components), the system determines in Step S5 that it is impossible to drive the water pump 60. In this case, the water pump 60 is not driven to protect the fuel cell system 10 from shutting down, but a different step is performed (Step S33), to proceed to Step S31 and begin power generation.

Next, reference will be made to FIG. 7 to describe an example of a main operation of the fuel cell system 10 after power generation has been started. In this example, the amount of the aqueous solution in the aqueous solution tank 18 is brought back to a predetermined level by gradually increasing the amount in accordance with a temperature increase in the fuel cell 12.

As the fuel cell system 10 starts power generation, the temperature sensor 66 detects the temperature of the fuel cell 12 (Step S51). The system makes reference to the table data shown in FIG. 5($a$), to select/determine a target amount of the aqueous solution which corresponds to the detected temperature (Step S53). Then, the level sensor 22 detects the current amount of aqueous methanol solution S in the aqueous solution tank 18 (Step S55). The system checks if the detected amount of the aqueous solution is not smaller than the target amount of the aqueous solution (Step S57). If the detected amount of the aqueous solution is smaller than the target amount of the aqueous solution, the water pump 60 is driven, whereby water or aqueous solution in the water tank 44 is sent to the aqueous solution tank 18 via the water recycling pipe 58 (in the direction A shown in FIG. 1) (Step S59). The system then checks if the amount of the aqueous solution in the aqueous solution tank 18 has reached the target amount of the aqueous solution (Step S61). If the amount of the aqueous solution in the aqueous solution tank 18 has not yet reached the target amount of the aqueous solution, pumping of water or aqueous solution is continued until Step S63 determines that a predetermined amount of time has passed. After the lapse of the predetermined amount of time, Step S61 checks again if the target amount of the aqueous solution has been reached. The above described pumping is continued until Step S61 determines that the amount of the aqueous solution in the aqueous solution tank 18 has reached the target amount of the aqueous solution. Once Step S61 determines "YES", the water pump 60 is stopped (Step S65). Thereafter, adjustment is made until a desired concentration of the aqueous solution in the aqueous solution tank 18 is achieved (Step S66).

Next, the system checks if the aqueous solution tank 18 is full, i.e., if the amount of the liquid is for normal operation (which is 3L in the present preferred embodiment) (Step S67). If the aqueous solution tank 18 is full, normal operation is commenced. If the aqueous solution tank 18 is not full, the system waits until a predetermined amount of time has passed (Step S69: YES), and then brings the process back to Step S51, where the above described cycle is repeated until the aqueous solution tank 18 becomes full.

According to the fuel cell system 10 as described above, the amount of aqueous methanol solution S which is in circulation at the time of system start-up is smaller than the amount during the normal operation, whereby it becomes possible to decrease the thermal capacity of the aqueous methanol solution S which is in the circulation supply to the fuel cell 12. Therefore, it becomes possible to shorten the time required for heating the aqueous methanol solution S to a predetermined temperature (65° C., for example), thereby enabling an increase in the amount of generated power quickly after the start-up. Further, since heating is not provided by oxidization of the aqueous methanol solution S, fuel utilization efficiency does not decrease.

Further, by only adjusting the amount of aqueous methanol solution S in the aqueous solution tank 18, the amount of aqueous methanol solution S in the fuel supplying device 41 is easily adjusted.

Moreover, an extra amount of aqueous methanol solution S is moved from the fuel supplying device 41 to the water tank 44. Therefore, there is no need for an extra tank.

Further, the amount of aqueous methanol solution S in the fuel supplying device 41 at an early stage is adjusted on the basis of the temperature of the fuel cell 12, whereby it becomes possible to increase the temperature of aqueous methanol solution S quickly while maintaining a temperature stability of the fuel cell 12. Further, there is no need for excessively decreasing the amount of aqueous methanol solution S, drive time of the water pump 60 can be optimized, and power consumption can be decreased.

Moreover, at the time of normal operation after the predetermined temperature has been attained, the amount of aqueous methanol solution S is at a predetermined level, i.e., the aqueous solution tank 18 is full. This provides sufficient thermal capacity and stabilizes the system temperature, the concentration of aqueous methanol solution S, etc.

Further, after starting power generation, the amount of aqueous methanol solution S in the fuel supplying device 41 is set in a stepped manner in accordance with the temperature of the fuel cell 12 and the amount is increased gradually. Therefore, it is possible to bring the amount of aqueous methanol solution S back to a predetermined amount without sacrificing the temperature stability of the fuel cell 12.

Next, reference will be made to FIG. 8 to describe another example of a main operation after the fuel cell system 10 has started power generation. In this example, the fuel cell temperature is increased to a predetermined temperature, and then the amount of the aqueous solution is brought back to a predetermined amount while maintaining the temperature stably.

As the fuel cell system 10 starts power generation, the temperature sensor 66 detects the temperature of the fuel cell 12 (Step S101). The system checks if the temperature of the fuel cell 12 has reached a predetermined temperature (65° C., for example) (Step S103). If the temperature of the fuel cell 12 has not reached the predetermined temperature, the system waits until a predetermined amount of time has passed (Step S105: YES), and then goes back to Step S101 again, to repeat the above described cycle until the predetermined temperature is reached. When Step S103 determines that the temperature of the fuel cell 12 has reached the predetermined temperature, the system checks if the aqueous solution tank 18 is full or not (Step S107). If the aqueous solution tank 18 is not full, the system checks if the temperature of the fuel cell 12 is not lower than a predetermined temperature (65° C., for example) (Step S109). If the temperature of the fuel cell 12 is lower than the predetermined temperature, the system waits until a predetermined amount of time has passed (Step S111: YES), and then goes back to Step S107 again. If the aqueous solution tank 18 is not full (Step S107: NO) and the temperature of the fuel cell 12 is not lower than the predetermined temperature (Step S109: YES), the water pump 60 is driven to send water or aqueous solution from the water tank 44 to the aqueous solution tank 18 via the water recycling pipe 58 (Step S113). Then, the system checks if the temperature of the fuel cell 12 is not lower than a predetermined temperature (65° C., for example) (Step S115). If the temperature of the fuel cell 12 is not lower than the predetermined temperature, the system waits until a predetermined amount of time has passed (Step S117: YES), and then goes back again to Step S115 again. In other words, water or aqueous solution is pumped until the temperature of the fuel cell 12 goes down below a predetermined temperature (65° C., for example). In this way the amount of the aqueous solution in the aqueous solution tank 18 is increased.

Once the temperature of the fuel cell 12 has dropped down below a predetermined temperature (65° C., for example), the water pump 60 is stopped (Step S119), adjustment is made so that a desired concentration of the aqueous solution in the aqueous solution tank 18 is achieved (Step S120), and the program goes back to Step S107, where the above described cycle is repeated until the aqueous solution tank 18 becomes full. Once the aqueous solution tank 18 is full, the system proceeds to normal operation.

According to the fuel cell system 10 which operates as described above, the amount of aqueous methanol solution S in the fuel supplying device 41 is increased in such a way that the temperature of the fuel cell 12 stays at a predetermined level. Therefore, it is possible to bring the amount of aqueous methanol solution S back to a predetermined amount without impairing the temperature stability of the fuel cell 12.

Note that the amount of the aqueous solution in the aqueous solution tank 18 may be increased to the full level (the amount for the normal operation) in a single step once the temperature of the fuel cell 12 has reached a predetermined level after the fuel cell system 10 has started power generation. This enables the shift to the normal operation quickly.

Figure 9:
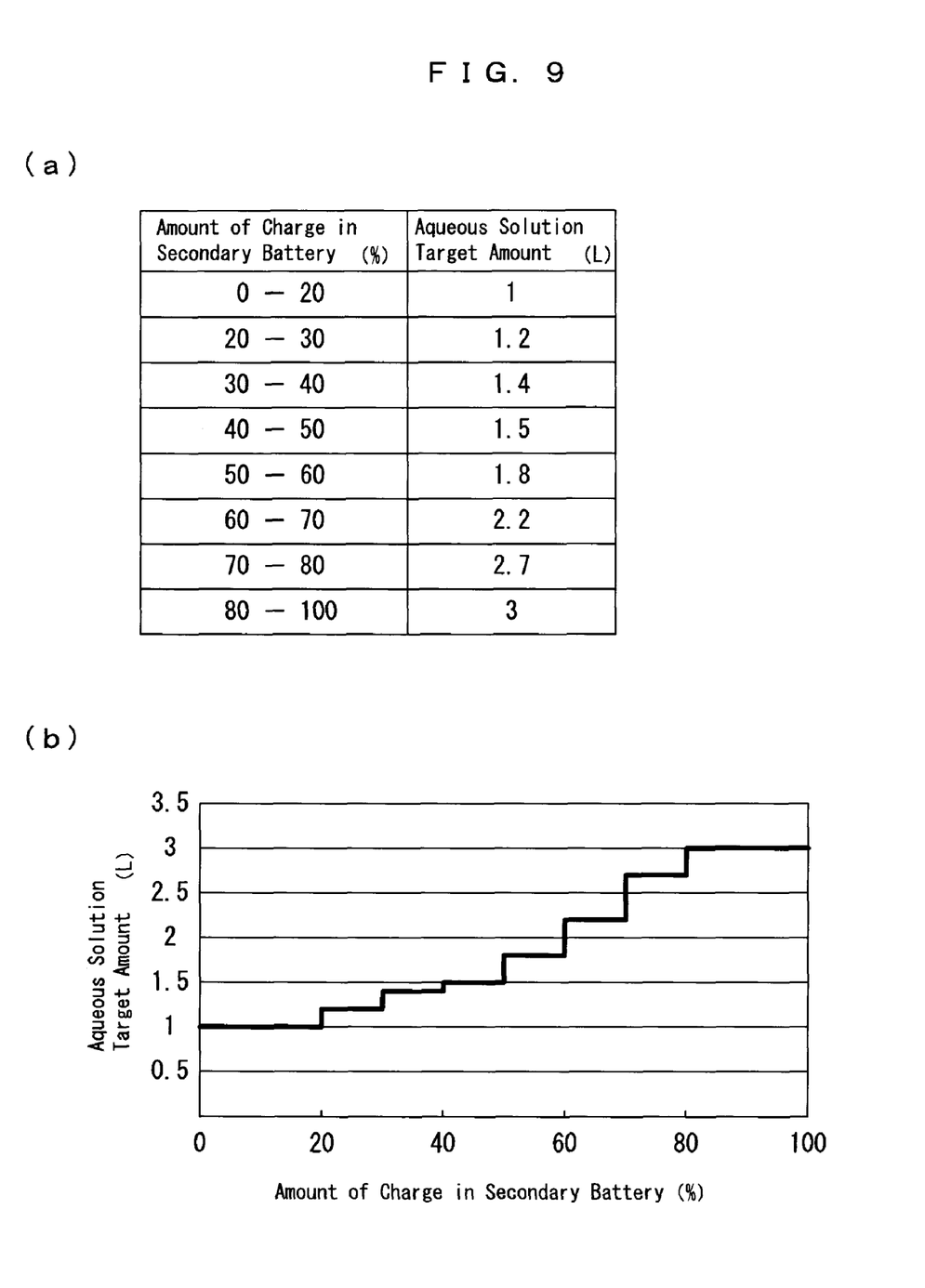

As another alternative, the memory 76 may store table data as shown in FIG. 9(*a*). The data relates the amount of the charge in the secondary battery 102 to the target amount of the aqueous solution for the system to set an initial amount of aqueous methanol solution S in the aqueous solution tank 18 in accordance with the amount of the charge in the secondary battery 102. The fuel cell 12 must be heated to a predetermined temperature (approximately 65° C., for example) more quickly if the amount of the charge in the secondary battery 102 is small. Therefore, the system sets the amount of the aqueous solution in the aqueous solution tank 18 to a smaller amount if the amount of the charge is small. FIG. 9(*b*) is a graph which shows a relationship between the amount of the charge in the secondary battery 12 and the target amount of the aqueous solution.

As described above, by adjusting the initial amount of aqueous methanol solution S in the fuel supplying device 41 based on the amount of the charge in the secondary battery 102, it becomes possible to heat aqueous methanol solution S to a desired predetermined temperature for power generation before depleting the charge in the secondary battery 102.

As another alternative, aqueous methanol solution S in the aqueous solution tank 18 may not be sent to the water tank 44 as shown in FIG. 1, but instead be sent to a separate relief tank 106. The relief tank 106 is connected with the aqueous solution tank 18 via a pipe 108, and the pipe 108 is provided with a pump 110 which is capable of pumping in either of two directions. As shown in FIG. 4, the pump 110 is controlled by the CPU 72. In this case, the pipe 108, the pump 110, and the control circuit 70 are included in the aqueous solution amount adjusting device. By driving the pump 110, aqueous solution is sent from the aqueous solution tank 18 to the relief tank 106 or in the opposite direction.

An extra amount of aqueous methanol solution S in the fuel supplying device 41 is moved to the relief tank 106 so there is no need for modifying the existing fuel cell system 10 which might affect the other components which define the existing fuel cell system 10.

In the preferred embodiments described above, the amount of the aqueous solution in the aqueous solution tank 18 is changed in order to adjust the amount of the aqueous solution in the fuel supplying device 41 and thereby to adjust the amount of the aqueous solution circulated by the fuel supplying device 41. However, the present invention is not limited to this. The amount of the aqueous solution may be changed at any desired portion within the fuel supplying device 41, such as at the aqueous solution pipe 24, the pipe 40, etc.

Still another variation may be that a movable partition plate is provided within the aqueous solution tank 18. The partition plate is moved to divide the aqueous solution in the aqueous solution tank 18 into two bodies, one for circulation and the other for non-circulation, whereby adjustment is made on the amount of aqueous methanol solution S which is circulating in the fuel cell 12 and the fuel supplying device 41.

The detection device for the amount of the aqueous solution in the aqueous solution tank 18 is not limited to those based on the liquid level in the tank, but may be of any other type.

The aqueous fuel solution is not limited to an aqueous methanol solution, but may be other aqueous alcohol solutions or the like.

Further, temperature detection maybe made not to the fuel cell 12, but may be made directly to the aqueous fuel solution.

The fuel cell system 10 can be utilized suitably not only in motorcycles but also in automobiles, marine vessels, and any other transportation equipment.

The present invention is also applicable to fuel cell systems which make use of a reformer. Further, the present invention is applicable to small-scale, stationary-type fuel cell systems.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A fuel cell system comprising:
a fuel cell including an anode;
a fuel supplying device arranged to circulate a supply of aqueous fuel solution to the anode of the fuel cell; and
an aqueous solution amount adjusting device programmed to set an amount of the aqueous fuel solution stored in the fuel supplying device and circulated within the fuel cell system for a start-up to an amount smaller than an amount for a normal operation.

2. The fuel cell system according to claim 1, wherein the fuel supplying device includes an aqueous solution tank arranged to store the aqueous fuel solution, and the aqueous solution amount adjusting device adjusts an amount of the aqueous fuel solution in the aqueous solution tank.

3. The fuel cell system according to claim 2, further comprising a tank, separate from the aqueous solution tank, arranged to store the aqueous fuel solution; wherein the aqueous solution amount adjusting device is programmed to move the aqueous fuel solution from the aqueous solution tank to the separate tank.

4. The fuel cell system according to claim 1, further comprising a water tank arranged to store liquid discharged from the fuel cell, wherein the aqueous solution amount adjusting device is programmed to move the aqueous fuel solution from the fuel supplying device to the water tank.

5. The fuel cell system according to claim 1, further comprising a relief tank arranged to receive the aqueous fuel solution from the fuel supplying device, wherein the aqueous solution amount adjusting device is programmed to move the aqueous fuel solution from the fuel supplying device to the relief tank.

6. The fuel cell system according to claim 1, further comprising a temperature detecting device arranged to detect a temperature of the fuel cell, wherein the aqueous solution amount adjusting device adjusts the amount of the aqueous fuel solution in the fuel supplying device in accordance with the temperature of the fuel cell detected by the temperature detecting device.

7. The fuel cell system according to claim 1, further comprising a secondary battery electrically connected with the fuel cell, and a charge detecting device arranged to detect an amount of a charge in the secondary battery, wherein the aqueous solution amount adjusting device adjusts the amount of the aqueous fuel solution in the fuel supplying device in accordance with the amount of the charge detected by the charge detecting device.

8. Transportation equipment including the fuel cell system according to claim 1.

9. The fuel cell system according to claim 1, wherein the aqueous solution amount adjusting device increases the amount of the aqueous fuel solution in the fuel supplying device to a predetermined amount for the normal operation after the start-up operation.

10. The fuel cell system according to claim 9, further comprising a temperature detecting device arranged to detect a temperature of the fuel cell, wherein the aqueous solution amount adjusting device increases the amount of the aqueous fuel solution in the fuel supplying device in accordance with the temperature of the fuel cell detected by the temperature detecting device.

11. The fuel cell system according to claim 9, further comprising a temperature detecting device arranged to detect a temperature of the fuel cell, wherein the aqueous solution amount adjusting device increases the amount of the aqueous fuel solution in the fuel supplying device when the temperature of the fuel cell detected by the temperature detecting device has reached a predetermined temperature, so that the temperature of the fuel cell will stay at the predetermined temperature.

12. The fuel cell system according to claim 9, further comprising a temperature detecting device arranged to detect a temperature of the fuel cell, wherein the aqueous solution amount adjusting device increases the amount of the aqueous fuel solution in the fuel supplying device to the predetermined amount when the temperature of the fuel cell detected by the temperature detecting device has reached a predetermined temperature.

* * * * *